United States Patent [19]

Szita

[11] 4,337,193

[45] Jun. 29, 1982

[54] PREPARATION OF HARDENED TALL OIL PITCH

[75] Inventor: Jeno G. Szita, Norwalk, Conn.

[73] Assignee: Arizona Chemical Company, Wayne, N.J.

[21] Appl. No.: 258,182

[22] Filed: Apr. 27, 1981

[51] Int. Cl.$^3$ .................. C09F 1/00; C08K 5/00; C08L 93/00

[52] U.S. Cl. ............................ 260/97.5; 106/218; 106/241; 260/97; 527/503; 527/501; 527/500; 524/14

[58] Field of Search ............... 260/97, 97.5, 24, 25, 260/27 R, 37 N, 38; 106/218, 241

[56] References Cited

U.S. PATENT DOCUMENTS

| | | | |
|---|---|---|---|
| 2,039,243 | 4/1936 | Krzikalla | 260/97.5 |
| 2,407,225 | 9/1946 | Dixon | 260/24 |
| 2,538,103 | 1/1951 | Koonce et al. | 260/97.6 |
| 2,731,415 | 1/1956 | Hook et al. | 260/97.5 |
| 3,238,164 | 3/1966 | Speck | 260/97.5 |
| 3,242,160 | 3/1966 | Barrett | 260/97.5 |
| 3,244,580 | 4/1966 | Stalego | 260/25 |
| 3,379,708 | 4/1968 | Peacock | 260/97.5 |
| 3,497,490 | 2/1970 | Arlt, Jr. et al. | 260/97.5 |
| 3,649,580 | 3/1972 | Arlt, Jr. et al. | 260/27 |

*Primary Examiner*—H. S. Cockeram
*Attorney, Agent, or Firm*—Gordon L. Hart

[57] ABSTRACT

Additives to tall oil pitch react to cause crosslinking which improves hardness, viscosity, tackiness, etc., properties of the modified pitch. Additives include for example maleic anhydride, wood flour, formylated melamine, phenol and other resins, diisocyanates, alcohols and the like. The modified pitch has properties improved for use as binders for briquetting adhesives, etc.

5 Claims, No Drawings

PREPARATION OF HARDENED TALL OIL PITCH

The invention relates to modified tall oil pitch compositions which have a number of uses and are particularly useful as thermoplastic binders such as binders for making briquettes of metal or metal oxide or other powdered and granular materials used as additives in metals manufacture and the like.

In the manufacture of cast iron, steel and other metals, powdered or granular additives such as molybdenum oxide, magnesium, carbon, silica, etc. are sometimes added to the metal process melt for the purpose of obtaining a desired metal or alloy composition. It has been convenient to add powdered or granular materials which have been made up as briquettes containing a uniform measure of the desired ingredient, e.g. molybdenum oxide, in each briquette and which are held together with a binder of asphalt. In the hot metal melt the binder decomposes to provide carbon required for reduction and other useful or harmless decomposition products.

Unmodified tall oil pitch was proposed as a substitute binder in place of asphalt for the use described, but it was found to have certain disadvantages. Particularly, the softening temperature of tall oil pitch, about 20°-50° C., was usually lower than would be most desired and the briquettes made with unmodified tall oil pitch were deemed too soft and tacky for that particular use.

We have now modified tall oil pitch by reactions that promote or cause cross-linking and provide modified tall oil pitch compositions having properties improved for making adhesives, coatings, binders for briquettes used in metallurgy and for other uses. The improved properties include a range of softening points above 50° C., and ranges of increased hardness, increased viscosity and reduced tack.

Tall oil pitch is the by-product from the distillation of crude tall oil which has been produced by acid treatment of black liquor soap from the sulfate or Kraft paper process. Tall oil pitch is the distillation residue that remains after tall oil fatty acids and tall oil rosin have been distilled by fractional distillation from crude tall oil. The composition of tall oil pitch and hence its properties may vary because of variations in the crude tall oil composition and in the degree of distillation. Typically, pitches may vary in softening points from about 20° C. to about 50° C.

Tall oil pitch is available commercially, such as that offered by Arizona Chemical Company under the tradename ACINTOL® P. The pitch is known to contain rosin, high boiling neutral oils, dimers and higher oligomers of unsaturated tall oil fatty acids and rosin, fatty acid esters of sitosterol and fatty alcohols, etc.

Components of tall oil pitch contain reactive sites such as unsaturated double bonds, hydroxyl groups, carboxyl groups and also some sites which can be activated by free radical initiator catalysts. We may use one or preferably several additives for increasing reactive sites and hardening the tall oil pitch by cross-linking reactions at such reactive sites.

In the most preferred modified tall oil pitch compositions that we have made, we have used maleic anhydride as in initial additive. We believe maleic anhydride reacts by Diels Alder addition at double bonds in the pitch components. It can also add by free-radical addition when a catalyst is present. Such addition increases the number of available carboxyl groups which are potential sites for cross-linking. We then react the carboxyl-enriched pitch with agents that can cross-link by reaction with carboxyl groups. Our most preferred cross-linker for this purpose is CYMEL® 303 resin, a hexamethoxymethyl melamine resin. The methoxymethyl groups can react with carboxyl groups. Alternatively, we may use partically and fully alkylated melamine-formaldehyde resins such as CYMEL 370 and CYMEL 325, CYMEL 1156 and CYMEL 245; non-alkylated melamine formaldehyde resins such as CYMEL 405; alkylated urea-formaldehyde resins such as BEETLE® 65, BEETLE 80 and BEETLE 1050; non-alkylated urea formaldehyde resins and resole type phenol formaldehyde resins (resinoids), and the like. These resins have polyfunctional groups that are reactive with carboxyl or hydroxyl groups in the pitch components and hence give rise to a network structure by a cross-linking reaction.

We may also use as cross-linkers polyfunctional isocyanates having two, three or more isocyanate groups per molecule. Toluene diisocyanate is a useful difunctional isocyanate for cross-linking. Other polyfunctional isocyanates that are commercially available include MONDUR® MR available from Mobay Chemical Co., PAPI® 20 from Upjohn Co., and the like.

We may also add polyamines such as triethylenetetramine, tetraethylenepentamine, 2,4-bis(p-aminobenzyl)aniline and the like. We may also add polyfunctional alcohols such as glycerine, pentaerythritol, di- and tri-pentaerythritol, sucrose, dextrin, sorbitol, starch, polyvinyl alcohol and the like. These can be added preferably prior to the melamine/formaldehyde or isocyanate cross-linkers. They provide additional reactive sites, such as hydroxyl or amino groups for cross-linking.

For use of any of the foregoing types of cross-linkers it is effective to simply add them to the tall oil pitch, preferably after it has first been reacted with maleic anhydride, and then heat the mixture to induce cross-linking reactions until the desired degree of modification of the pitch has been achieved.

For changing the properties of tall oil pitch, we may also use cross-linkers which can react by free-radical initiated addition at reactive sites in the pitch components. These are mono-functional or multifunctional vinyl monomers which add by free radical addition to reactive sites in the pitch composition to provide additional hydroxyl or amino groups for cross-linking reactions. Some examples of vinyl compounds of this type are diallylamine, glycerine diacrylate, pentaerythritol triacrylate, N-methylol acrylamide, and the like. To obtain the free radical addition reaction, we also add a free radical initiator having half-life of ten minutes to ten hours at the reaction temperature. Preferred free radical initiators are azo initiators such as azobisisobutyronitrile and peroxy initiators such as t-butyl hydroperoxide and the like. When a free radical initiator is used with maleic anhydride the latter may react by free radical addition with pitch component molecules and thereby either add to one molecule or cross-link two component molecules. Thus when a catalyst is used in combination with maleic anhydride the latter can react by both Diels Alder addition and free radical initiated addition.

An especially useful additive for modifying hardness of the tall oil pitch is wood flour which functions as a filler and may also enter into cross-linking reactions since it is a polyhydroxy reactant. Any of the several wood flours commercially available may be used.

The time and temperature of the reactions need to be sufficient for completion of reactions that cause cross-linking. We have found that reaction temperature in the range from about 140° to 180° at reaction times from about one to three hours are usually sufficient.

The order of addition of the reactants may sometimes be important in obtaining particular desired modifications. It is preferred to first addd those reactants which will react with the pitch components to provide additional cross-linking sites. Such additives are maleic anhydride, the polyhydroxy and polyamine compound and vinyl additives having hydroxyl or carboxylic functional groups, and the like. It is usually preferred to introduce the wood flour or other filler before the cross-linking reactants are added. Finally, the cross-linking reactants such as the formylated melamine, urea and phenol resins or the diisocyanates are added to form an infinite network structure. Furthermore, it is usually preferred to add the reactants in order and wait until each has reacted before adding the next. For the following specific examples, the addition time for each additive is shown in the tables. All percentages shown are percent by weight based on the weight of the pitch.

EXAMPLE 1

A 500 ml, 3-neck reactor equipped with agitator, thermometer, nitrogen inlet, dropping funnel and a distillation adaptor was charged with 200 g of molten tall oil pitch having a softening point of 20° C. Ring & Ball Method ASTM E-28-67(1977). Next were added in order ten percent of maleic anhydride, one percent of t-butyl hydroperoxide, fifteen percent of wood flour and five percent of CYMEL 303 brand hexamethoxymethyl melamine resin. The mixture was reacted while stirring for a total of 85 minutes at reaction temperatures from 70° C. increasing to 185° C. The elapsed times between the addition of maleic anhydride and other components are shown in Table I.

After the reaction was completed the modified pitch composition was tested for softening point which had increased to 79° C.; for Shore A hardness which measured 90; for Brookfield viscosity at 325° C., which was determined to be 3,850 centipoise (CPS). The reaction product was found to be non-tacky at room temperature. The same reaction steps were repeated several times, some with a different tall oil pitch (characterized by softening point as shown in Table I) and with variations or omissions in the amounts of the additives. The pertinent reaction data and product test results for all of the foregoing reactions are tabulated in Table I.

EXAMPLE 2

The same reaction vessel and the same amount of tall oil pitch was used as described in Example 1. Four different reactions were run using ten wt % maleic anhydride, one wt percent t-butylhydroperoxide, 15 percent wood flour and five percent CYMEL 303 as additives in each reaction. A polyhydroxyl or polyamino compound was used in each reaction, added after the catalyst but before the wood flour. The polyhydroxy compounds were glycerine and starch and the polyamines were triethylenetetramine and tetraethylenepentamine. The reaction details and product test results for each reaction are detailed in Table II.

EXAMPLE 3

In the same manner described in Example 2 tall oil pitch was treated by several reactions with maleic anhydride and t-butyl hydroperoxide in the same amounts, and using instead of the methoxymethyl melamine resin a polyfunctional isocyanate having an average of 2.6 isocyanate groups per molecule, purchased under the Mobay tradename MONDUR ® MR. Also added were to each reaction was a specific polyol, as further identified in Table III. The reactions and product test results are summarized in the same Table III.

EXAMPLE 4

Five separate reactions were carried out as described in Example 3 except that polyamine additives were used instead of the polyhydroxy additives. Details of the reactions and the product test results are summarized in Table IV.

TABLE I

| | Hardened Tall Oil Pitch - Reaction | | | | | |
|---|---|---|---|---|---|---|
| | A | B | C | D | E | F |
| Pitch: | | | | | | |
| Softening point, °C. | 20° | 20° | 50° | 50° | 20° | 20° |
| Additives* (wt. %)/Time of Addition after start (min.) | | | | | | |
| Maleic Anhydride | 10/0 | 10/0 | — | 10/0 | 10/0 | 10/0 |
| t-Butyl Hydroperoxide | — | — | — | 1/35 | — | 1/50 |
| Wood flour | — | 15/40 | 20/0 | 15/45 | 15/25 | 15/65 |
| CYMEL ® 303 | 5/40 | — | 10/15 | 5/65 | 5/40 | 10/80 |
| Reaction Conditions | | | | | | |
| Temperature (°C.) | 140–180 | 140–178 | 150–165 | 70–185 | 140–175 | 140–180 |
| Time to complete reaction (min.) | 75 | 75 | 95 | 85 | 60 | 125 |
| Product Properties | | | | | | |
| Softening Point (°C.) (Ring & Ball) | 49 | 56 | 64 | 79 | 81 | 89 |
| Hardness, Shore A | 65 | 63 | 70 | 90 | 70 | 85 |
| Viscosity (Brookfield) at 325° F. (cps) | 75 | 295 | 3,850 | 7,040 | 11,500 | 11,250 |
| Tack at room temperature | very tacky | very tacky | tacky | none | slight | none |

*The number in the numerator represents the weight of component added; the denominator indicates the time of addition.

TABLE II

| | Hardened Tall Oil Pitch - Reaction | | | |
|---|---|---|---|---|
| | G | H | I | J |
| Pitch: | | | | |
| Softening point, °C. | 50° | 20° | 46° | 20° |
| Additives* (wt. %)/Time of Addition after start (min.) *see footnote Table I | | | | |
| Maleic Anhydride | 10/0 | 10/0 | 10/0 | 10/0 |
| t-Butyl Hydroperoxide | 1/55 | 1/55 | 1/55 | 1/55 |
| Glycerine | 3/70 | — | — | — |
| Starch | — | 3/70 | — | — |
| Triethylene tetramine | — | — | 3/70 | — |
| Tetraethylene pentamine | — | — | — | 3/70 |
| Wood flour | 15/100 | 15/100 | 15/100 | 15/100 |
| CYMEL® 303 | 5/140 | 5/146 | 5/134 | 5/152 |
| Reaction Conditions | | | | |
| Temperature (°C.) | 145–178 | 145–176 | 145–175 | 145–175 |
| Time to complete reaction (min.) | 163 | 170 | 164 | 152 |
| Product Properties | | | | |
| Softening Point (°C.) (Ring & Ball) | 108 | 64 | 85 | 89 |
| Hardness, Shore A | 85 | 75 | 80 | 85 |
| Viscosity (Brookfield) at 325° F. (cps) | 57,000 | 663 | 11,000 | 4,450 |
| Tack at room temperature | none | very slight | none | very slight |

TABLE III

| | Hardened Tall Oil Pitch - Reaction | | | | | | | |
|---|---|---|---|---|---|---|---|---|
| | K | L | M | N | O | P | Q | R |
| Pitch: | | | | | | | | |
| Softening point, °C. | 20° C. | 20° C. | 20° | 20° | 20° | 20° | 20° | 20° C. |
| Additives* (wt. %)/Time of Addition after start (min.) *see footnote Table I | | | | | | | | |
| Maleic Anhydride | 10/0 | 10/0 | 10/0 | 10/0 | 10/0 | 10/0 | 10/0 | 10/0 |
| t-Butyl Hydroperoxide | 1/55 | 1/55 | 1/50 | 1/55 | 1/55 | 1/45 | 1/55 | 1/55 |
| Glycerine | 3/75 | 3/70 | 2.5/65 | — | — | — | — | — |
| Tripentaerythritol | — | — | — | 3/70 | — | — | — | — |
| Sorbitol | — | — | — | — | 3/70 | — | — | — |
| Sucrose | — | — | — | — | — | 3/80 | — | — |
| Dextrin | — | — | — | — | — | — | 3/70 | — |
| Starch | — | — | — | — | — | — | — | 3/70 |
| Wood flour | — | 15/100 | — | 15/100 | 15/100 | 15/108 | 15/100 | 15/100 |
| MONDUR® MR | 5/90 | 5/130 | 10/85 | 5/140 | 5/135 | 5/120 | 5/130 | 5/137 |
| Reaction Conditions | | | | | | | | |
| Temperature (°C.) | 160–180 | 145–180 | 140–185 | 145–167 | 145–165 | 145–180 | 145–178 | 145–165 |
| Time to complete reaction (min.) | 115 | 160 | 120 | 172 | 170 | 138 | 160 | 170 |
| Product Properties | | | | | | | | |
| Softening Point (°C.) (Ring & Ball) | 58 | 80.5 | 104 | 69 | 66 | 60 | 61 | 64 |
| Hardness, Shore A | 65 | 85 | 65 | 85 | 77 | 75 | 65 | 75 |
| Viscosity (Brookfield) at 325° F. (cps) | 153 | 16,750 | 4,250 | 2,525 | 1,725 | 925 | 5,600 | 2,625 |
| Tack at room temperature | tacky | none | none | slight | slight | slight | tacky | slight |

TABLE IV

| | Hardened Tall Oil Pitch - Reaction | | | | |
|---|---|---|---|---|---|
| | S | T | U | V | W |
| Pitch: | | | | | |
| Softening Point °C. | 20° C. | 20° | 20° | 20° | 46 |
| Additives* (wt %) Time of Addition after start (min.) *see footnote Table I | | | | | |
| Maleic Anhydride | 10/0 | 10/0 | 10/0 | 7.5/0 | 10/0 |
| t-Butyl Hydroperoxide | 1/55 | 1/55 | 1/55 | 0.75/55 | 1/55 |
| Triethylene tetramine | 3/70 | — | — | — | 3/70 |
| Tetraethylene pentamine | — | 3/70 | 3/70 | 2/70 | — |
| Wood flour | 15/100 | 15/100 | — | 15/95 | 15/100 |
| MONDUR® MR | 5/130 | 5/135 | 5/90 | 3/120 | 5/130 |

TABLE IV-continued

| | Hardened Tall Oil Pitch - Reaction | | | | |
|---|---|---|---|---|---|
| | S | T | U | V | W |
| Reactions Conditions | | | | | |
| Temperature (°C.) | 145–176 | 145–170 | 145–180 | 145–180 | 145–176 |
| Time to complete reaction (min.) | 160 | 160 | 100 | 135 | 160 |
| Product Properties | | | | | |
| Softening Point (°C.) (Ring & Ball) | 97 | 93 | 96 | 64 | 137 |
| Hardness, Shore A | 85 | 90 | 75 | 75 | 80 |
| Viscosity (Brookfield) at 325° F. (cps) | 8,600 | 7,500 | 850 | 1,840 | >57,000 |
| Tack at room temperature | none | none | none | slight | none |

In the foregoing description and examples we have demonstrated the use of various additives to promote cross-linking of tall oil pitch components with the result that the pitch compositions can be substantially modified to obtain improved properties particularly with regard to higher softening point, greater hardness, higher viscosity and less tack. Modified tall oil pitch compositions prepared as described may be used in a variety of applications such as binders for briquetting, in coating compositions for sound deadening, in core oils, in binders for roofing compositions, in pipe joint compounds and the like. By selection of certain combinations of the several additives available we may tailor a modified tall oil pitch to produce a desired combination of the several properties within the ranges described.

From the data in the tables it can be seen that modified pitches having a variety of improved properties can be obtained by selection of suitable additives. Thus, pitches can be modified to best suit the requirements for a specific use. In mineral ore briquetting, pitch used as a binder would preferably have high hardness (>85 Shore A hardness) moderate softening point (70° to 90° C., R&B) and moderate viscosity (2000 to 8000 cps) with complete absence of tack at room temperature. For adhesive components, one might make a pitch modified to increase softening point and viscosity with less regard to hardness but with retention of tack.

Data in the tables suggest some preferred combinations. The use of maleic anhydride, wood flour and CYMEL 303 together improves each of softening point, hardness, viscosity and freedom from tack while other combinations may affect only some of those properties substantially.

Some selected additives seem superior; diallylamine, at only 3 wt percent increased softening point and viscosity substantially, when used in combination with the other additives. The polyfunctional tetraethylenepentamine and glycerine were also unusually effective in the combinations in which they were used.

The amounts of the several additives used for a given amount of unmodified tall oil pitch will affect the degree of modification attained. For useful modification one may use additives in the ranges shown below, as percent by weight based on the weight of unmodified tall oil pitch being treated;

Maleic anhydride can be used in amounts ranging from 1 to 20 wt percent, usually from 5 to 15 wt percent.

Cross-linking resins such as the CYMEL resins, other formylated resins and polyfunctional isocyanates are useful in amounts from 1 to 20 wt percent, usually about 5 to 15 wt percent.

The multifunctional additives such as polyamines, polyfunctional vinyl, allyl or acryl compounds and the like are useful in amounts from about 0.5 to 15 wt percent, usually about 2 to 5 wt percent.

When catalysts are used they are present in catalytic amounts e.g. 0.1 to 2 wt percent.

Wood flour is used in the range from 5 to 30 wt percent, usually about 10–20 wt percent.

The reaction temperature usually starts at a temperature above the softening point of the unmodified pitch, in order to fluidize the pitch and to support the reactions, and usually is increased as the reactions proceed, to maintain the fluid condition as the viscosity increases.

We claim:

1. Modified tall oil pitch compositions comprising tall oil pitch reacted with at least one additive selected from polycarboxylic acids, polyfunctional amines, polyhydroxyl compounds, alkyl, vinyl and acrylic compounds having one or more amino, hydroxyl or carboxylic functional groups; and further reacted with at least one cross-linking compound selected from polyisocyanates, alkylated and non-alkylated melamine formaldehyde resins, alkylated and non-alkylated urea formaldehyde resins and resole type phenol-formaldehyde resins.

2. Modified tall oil pitch composition comprising tall oil pitch reacted with maleic anhydride and further reacted with at least one other additive including a cross-linking compound selected from polyisocyanates methoxymethyl melamine resins, alkylated and non-alkylated melamine formaldehyde resins, alkylated and non-alkylated urea formaldehyde resins and resole type phenol formaldehyde resins.

3. A modified tall oil pitch composition comprising tall oil pitch reacted with maleic anhydride and at least one other additive selected from wood flour, polyfunctional amines, polyhydroxyl compounds, polycarboxylic acids; allyl, vinyl and acrylic compounds having one or more amino, hydroxyl or carboxylic functional groups; and further reacted with at least one other cross-linking compound selected from polyisocyanates, methoxymethyl melamine resins, alkylated and non-alkylated melamine formaldehyde resins, alkylated and non-alkylated urea formaldehyde resins and resole type phenol formaldehyde resins.

4. A modified tall oil composition defined by claim 1 wherein the additives are maleic anhydride, wood flour and methoxymethyl melamine resin.

5. A modified tall oil composition defined by claim 1 wherein the additives further comprise a free radical addition initiator.

* * * * *